J. MORISAK.
FLY TRAP.
APPLICATION FILED OCT. 30, 1918.
1,308,439.
Patented July 1, 1919.
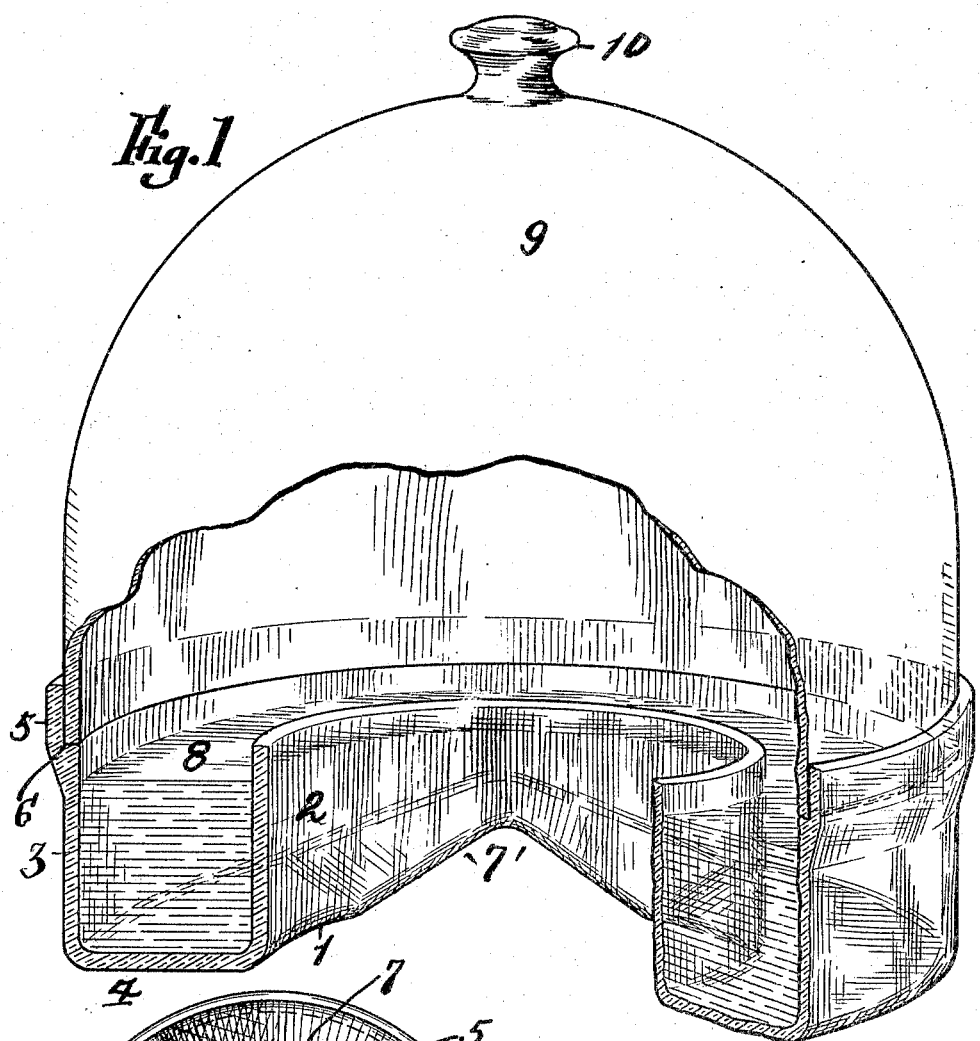
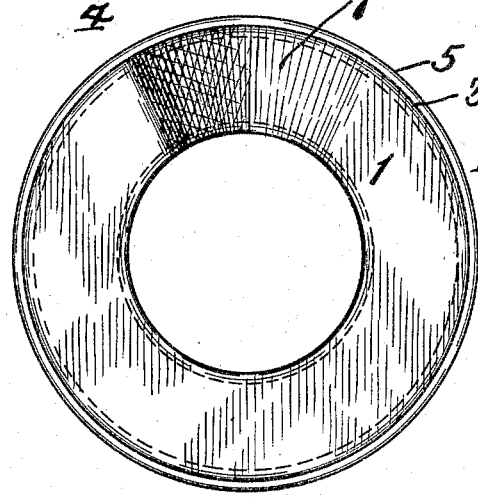
INVENTOR-
John Morisak,
By C. E. Humphrey
ATTORNEY.

UNITED STATES PATENT OFFICE.

JOHN MORISAK, OF AKRON, OHIO.

FLY-TRAP.

1,308,439.      Specification of Letters Patent.      Patented July 1, 1919.

Application filed October 30, 1918. Serial No. 260,333.

*To all whom it may concern:*

Be it known that I, JOHN MORISAK, a citizen of the United States, residing at Akron, in the county of Summit and State of Ohio, have invented new and useful Improvements in Fly-Traps, of which the following is a specification.

This invention relates to improvement in fly traps.

The object of the invention is to provide an efficient device for trapping and killing flies and similar insects so constructed that it may be easily cleaned and rendered sterile at all times and the efficiency of which, by experience has proven, in use to possess great efficiency. The device contemplates a trap composed of a transparent material such as glass composed of two sections, a base and an upper portion or dome capable of being easily separated for cleansing purposes, the lower or base portion providing a bath or reservoir for containing a fly killing fluid as well as being provided with an entrance for the flies.

With the foregoing and other objects in view, the invention consists in the novel construction, combination and arrangement of parts constituting the invention to be hereinafter specifically described and illustrated in the accompanying drawings which form a part hereof, wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a perspective view of a device embodying the present invention with portions thereof broken away to better illustrate the interior of the same, and Fig. 2 is an inverted plane on a reduced scale of the device shown in Fig. 1.

It is contemplated that the entire device will be constructed of glass or similar transparent and waterproof material and while glass is the preferable material employed the invention is not thereby limited.

The device embodies a base 1 comprising a trough-like annularly formed member having an inner wall 2, outer wall 3 and a lower wall 4, all integral or formed in a single piece. The upper portions of the outer walls 3 are provided with an offset 5 providing a seat 6 for a purpose to be later described. The inner wall 2, outer wall 3 and lower wall 4 are upwardly inclined at 7 to provide an entrance to the space inclosed by the inner wall 2. The walls 2, 3, and 4 are arranged to constitute a tank in which may be placed a fluid 8 possessing the properties of killing flies which are precipitated or fall therein. Arranged to be mounted on the seat 6 is a closure member 9, dome-shaped in side elevation and also constructed of a transparent material such as glass. This closure member 9 is for convenience equipped with a handle 10 preferably integral therewith.

In operation the flies enter through the opening 7 and fly upwardly to the inner, upper face of the dome 9 and from whence they are precipitated in to the bath 8 from whence they are removed as desired. For cleansing purposes the dome 9 may be removed or sterilized separately from the lower or base portion 1. If desired suitable fly inducing media such as vinegar and brown sugar may be placed within the space inclosed by the wall 2 to attract flies into the trap. The flies passing into the trap through the entrance 7 following their natural proclivities fly to the upper portion of the dome and slide down into the bath 8, which consists of a fly killing liquid. The device is so designed that it is of ornamental appearance and being constructed of glass can easily be sterilized and placed on any article of furniture such as a table and as it is selfcontained the flies are retained within the device and are killed by the action of the liquid 8 in the tank formed by the base.

It is pointed out that by providing the seat 6 for the dome 9 a smooth and unbroken surface is afforded down which the flies slide or walk into the bath 8 and therefore no ledges or projections are afforded for their support to prevent immersion in the solution contained in the base, the connection between the dome 9 and base 1 being smooth for this purpose. It is apparent that the entire device may be easily sterilized by separating the two portions and either immersing them in a sterilized solution or boiling the same to render the same absolutely clean at all times. The transparency of the dome rendering the device more efficient for the reason that the flies passing into the entrance 7 will naturally fly into the upper portion of the dome and from there are precipitated or fall into the liquid contained in the tank formed by the base.

I claim,

A fly trap including a trough-like annularly formed base member having spaced inner and outer side walls connected by a bottom wall, said side walls and bottom wall being inclined upwardly at one place to form an entrance to the space inclosed by the inner wall, and a cover mounted upon the outer wall.

In testimony whereof I have hereunto set my hand.

JOHN MORISAK.

Copies of this patent may be obtained for five cents each, by addressing the "Commissioner of Patents, Washington, D. C."